United States Patent [19]
Vanhoye et al.

[11] Patent Number: 5,919,840
[45] Date of Patent: Jul. 6, 1999

[54] (METH) ACRYLIC RESIN COMPOSITIONS FOR MARINE ANTIFOULING PAINTS AND CORRESPONDING PAINT COMPOSITIONS

[75] Inventors: Didler Vanhoye, Bernay; Michel Camail, Brignoles; Andre Margaillan, Garcoult; Jean-Louis Vernet, La Farlede; Marie Humbert, Marscille, all of France

[73] Assignee: Elf Atochem, S.A., Puteaux, France

[21] Appl. No.: 08/915,799

[22] Filed: Aug. 21, 1997

[30] Foreign Application Priority Data

Aug. 22, 1996 [FR] France ................................. 96 10374

[51] Int. Cl.$^6$ .............................. C09J 201/02; C08F 8/42; C08F 230/04
[52] U.S. Cl. ....................... 523/177; 523/122; 525/330.2; 526/240
[58] Field of Search ..................................... 523/122, 177; 525/330.2; 526/240

[56] References Cited

U.S. PATENT DOCUMENTS

| | | | |
|---|---|---|---|
| 4,241,198 | 12/1980 | Kobayashi et al. | 525/360 |
| 4,820,748 | 4/1989 | Yamamori et al. | 523/122 |
| 4,835,231 | 5/1989 | Yamamori et al. | 526/240 |
| 4,910,234 | 3/1990 | Yamamori et al. | 424/78.09 |

FOREIGN PATENT DOCUMENTS

| | | |
|---|---|---|
| 0 259 096 | 3/1988 | European Pat. Off. . |
| 0 260 958 | 3/1988 | European Pat. Off. . |
| 0 286 243 | 10/1988 | European Pat. Off. . |
| 2 011 427 | 7/1979 | United Kingdom . |

*Primary Examiner*—Tae Yoon

[57] ABSTRACT

This organosoluble (meth)acrylic resin composition is characterized in that it includes a polymer containing units derived from methacrylic acid which are esterified with —Ti(OR)$_3$ groups, mixed with free Ti(OR)$_4$, which represents the excess of Ti(OR)$_4$ which has been introduced for the preparation of the said polymer in sufficient quantity for the resulting composition to be organosoluble and not in gel form, R representing one of ethyl, isopropyl, n-butyl, t-butyl, 2-ethylhexyl and t-amyl. It may be the product of esterification in a solvent medium of a polymer containing units derived from methacrylic acid with Ti(OR)$_4$, the Ti/COOH molar ratio being higher than 1, preferably being between 3/1 and 10/1; or the product of radical copolymerization in a solvent medium of at least one methacrylic acid esterified with Ti(OR)$_3$ and of at least one comonomer, in the presence of Ti(OR)$_4$, in a quantity which would have corresponded to a reaction between the methacrylic acid and Ti(OR)$_4$ with a molar ratio 1/x, x>1.

26 Claims, No Drawings

(METH) ACRYLIC RESIN COMPOSITIONS FOR MARINE ANTIFOULING PAINTS AND CORRESPONDING PAINT COMPOSITIONS

CROSS-REFERENCE TO RELATED APPLICATION

This application is related to a concurrently filed and commonly assigned application entitled "UNSATURATED ORGANOMETALLIC COMPOUNDS DERIVED FROM TITANIUM AND PROCESS FOR THEIR PREPARATION" (Attorney Docket No.: ATOCM 94) based on French priority application 96/10372 filed Aug. 22, 1996, incorporated by reference herein.

FIELD OF THE INVENTION

The present invention relates to the preparation of (meth) acrylic resins for marine antifouling paints which are self-polishing in character and which do not have a negative ecotoxicological impact on the marine environment. The invention also relates to the corresponding paint compositions.

SUMMARY OF THE INVENTION

Since the 1960s self-polishing antifouling paints based on organotin derivatives have been developed and widely employed worldwide.

The use of these binders introduces many advantages: increase in the duration of action, decrease in the quantity of active product to be incorporated with equivalent performance and absence of intermetallic corrosion phenomena. In contrast to conventional paints, the use of self-polishing paints makes it possible to obtain a release of active species which is continuous in time. In addition, the gradual erosion of the polymer makes it possible to obtain an improvement in the state of the surface and a decrease in the roughening between two careenages. However, after many studies it has been shown that high tin concentrations would cause anomalies in the calcification of oysters and a decrease in the spat capture. Following these studies, the use of stannic derivatives has formed the subject of prohibition in France in the case of vessels of a length of less than 25 metres and of similar restrictions in other countries.

The search for a new resin imparting the same self-polishing properties to the film of antifouling paint has since then constituted an important line of research. Accordingly, the preparation of polymers containing triorganosilyl units has been developed by various companies in order to obtain polymers exhibiting good self-polishing properties, but still high in price.

In an attempt to provide a solution to this problem it has been envisaged to replace silicon with titanium, whose stability and nontoxicity in oxide form is furthermore known. The use of acrylic monomers carrying titanate groups has been described for the preparation of crosslinked polymer particles which can be employed as fillers in marine antifouling paint compositions: JP 57 565/87, EP 286 243, JP 57 564/87, JP 86-217 781, EP 260 958, JP 86-200 344 and EP 259 096. These particles are said to have the property of disintegrating in a slightly basic medium, in particular in seawater, and produce self-polishable coatings.

However, these patents do not describe the preparation of organosoluble resins which can be used as binders in marine antifouling paint compositions.

SUMMARY OF THE INVENTION

It has now surprisingly discovered that, when polymers carrying methacrylic acid functional groups are esterified with tetraalkoxytitaniums, the use of an excess of the latter in relation to the acidic functional groups makes it possible to obtain organosoluble reaction products which can be used as binders in marine paints, whereas the stoichiometric ratios employed in the examples of the abovementioned patents result in gels being produced during the esterification. The same happens when a tetraalkoxytitaniums methacrylate is copolymerized by a radical route with at least one comonomer in the presence of tetraalkoxytitanium. In both cases the products obtained are, before evaporation, soluble in the usual organic solvents (toluene, xylene or alcohol ethers), in which they are generally prepared. After evaporation of the solvent they are no longer soluble (in the said solvent or in the said solvents). The rate of erosion of coatings (paints) prepared with these products as binders, evaluated by direct measurement on paint formulations, is constant in time.

The subject-matter of the present invention is therefore firstly an organosoluble (meth)acrylic resin composition characterized in that it includes a polymer containing units derived from methacrylic acid which are esterified with —Ti(OR)$_3$ groups, mixed with free Ti(OR)$_4$, which represents the excess of the Ti(OR)$_4$ which has been introduced for the preparation of the said polymer in sufficient quantity for the resulting composition to be organosoluble and not in gel form, R denoting one of ethyl, isopropyl, n-butyl, t-butyl, 2-ethylhexyl and t-amyl.

It has been observed that, in general, the more hindered are the Radicals, the less large the excess of Ti(OR)$_4$ needs to be for an organosoluble composition to be successfully obtained.

The following may be mentioned as particular organosoluble compositions according to the invention (for a total of 100 % of esterified polymer+free Ti(OR)$_4$):

|  | Polymer | | |
| --- | --- | --- | --- |
| Resin | Methacrylic acid units esterified with Ti(OR)$_4$ | Comonomer units | Free Ti(OR)$_4$ |
| molar % | 2–17 | 23–89 | 7–69 |
| mass % | 4–27 | 5–63 | 22–86 |

The esterified polymer is especially a copolymer containing esterified methacrylic acid units and units of at least one comonomer chosen from in particular C$_1$–C$_6$ alkyl (meth) acrylates such as methyl methacrylate, butyl methacrylate and the like.

The organosoluble composition is generally in a solvent medium consisting of toluene, xylene, alcohol ethers like 2-methoxyethanol or 1-methoxy-2-propanol and mixtures thereof. The solids content of the organosoluble composition is generally approximately 20–80 % by weight, preferably approximately from 30 to 60 % by weight.

In accordance with a first embodiment of the present invention the organosoluble composition is the product of esterification in a solvent medium of a polymer containing units derived from methacrylic acid with Ti(OR)$_4$, the Ti/COOH molar ratio being higher than 1, capable of ranging up to 17/1, or even beyond, preferably being between 3/1 and 10/1.

In accordance with a second embodiment of the present invention the organosoluble composition is the product of radical copolymerization in a solvent medium of at least one methacrylic acid esterified with Ti(OR)$_3$ and of at least one comonomer, in the presence of Ti(OR)$_4$, in a quantity which would have corresponded to a reaction between methacrylic acid and Ti(OR)$_4$ with a molar ratio 1/x, x>1. In particular, the same ranges of Ti/COOH molar ratio as in the first embodiment may be indicated.

The above cross-referenced application "Unsaturated organometallic compounds derived from titanium and process for their preparation" describes the compounds of formula (I):

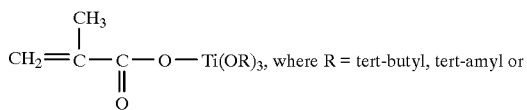

2-ethylhexyl. To prepare the compounds (I), methacrylic acid is reacted with a tetraalkoxytitanium Ti(OR)$_4$, where R=isopropyl or tert-butyl, to obtain the corresponding compound (I), or with Ti (OR) (OtAm)$_3$, where R=isopropyl or tert-butyl and tAm=tert-amyl, to obtain a compound (I) with R=tert-amyl, the compounds (I) with R=isopropyl or tert-butyl furthermore representing intermediate products of synthesis which can be reacted with tert-amyl alcohol or with 2-ethylhexanol, to obtain a compound (I) in which R denotes tert-amyl or 2-ethylhexyl respectively. The compounds with R=ethyl, isopropyl and n-butyl are prepared according to known procedures.

The polymerization conditions employed within the scope of the preparation of the resins are well known to a person skilled in the art, the polymerization being conducted at a temperature especially of between 40 and 85° C., in the presence of azo radical initiators such as azobisisobutyronitrile (AIBN or AZDN marketed by Elf Atochem), or 2,2'-azobis(2,4-dimethylvaleronitrile) (AIVN) or of peroxide radical initiators such as dibenzoyl peroxide, in a proportion especially of 0.05 to 1.5% by weight relative to the total weight of the monomers and of the excess Ti(OR)$_4$.

In the latter case, the organosoluble composition may also contain the ROH originating from the esterification of methacrylic acid with Ti(OR)$_4$, the crude product of the said esterification having been used in the copolymerization reaction. In this case the alcohol formed acts as cosolvent.

Another aspect of the present invention is directed to a marine antifouling paint composition characterized in that it includes, as binder, the composition as defined above. The binder is present in the paint composition for example in a proportion of from 30 to 40% by weight of the total.

The paint composition is otherwise conventional, since it may include the usual other ingredients such as:
- adjuvants, such as soya lecithin, modified hydrogenated castor oil, viscosity stabilizers (such as Viscostab CNF 896 manufactured by Elf Aquitaine);
- pigments and fillers, such as nonacicular zinc oxide, cuprous oxide and rutile titanium oxide; and
- solvents and diluents, such as solvent naphtha, toluene and xylene.

The following examples illustrate the present invention without, however, limiting its scope.

The resins employed form part of the Elvacite® series; they have been supplied to the Applicant Company by SPCI and have been manufactured by ICI:
Elvacite® 2550: methacrylic copolymer whose $^1$H NMR and $^{13}$C NMR analysis shows it to be a methacrylic acid (MAA)—methyl methacrylate (MMA)—n-butyl methacrylate (BuMA) terpolymer in molar proportions of 4-14-82; acid value given by the manufacturer=17;

Tg=36° C.: Mn=57 700, Mw=120 700 and I=2.09 (molecular masses measured by GPC).

Elvacite® 2669: water-soluble, slightly alkaline acrylic resin; this is a tetrapolymer which, besides the methacrylic acid units includes methyl methacrylate, ethyl methacrylate and ethyl acrylate units. Acid value given by the manufacturer =124; molecular mass given by the manufacturer=60 000; Tg=100° C.

In these examples SC means solids content, nBu: n-butyl, and EH: 2-ethylhexyl.

EXAMPLE 1

Esterification of the Elvacite® 2550 resin with Ti(OnBu)$_4$ at a Ti/COOH molar is ratio of 7/1 and at SC=30%

5 g of Elvacite® 2550 resin are dissolved in 20 g of anhydrous toluene in a 100-ml single-necked round bottom flask. The addition of 3.62 g of pure tetrabutoxytitanium is then carried out and the mixture is subjected to vigorous stirring. A large increase in the viscosity of the mixture is immediately observed and then this quickly changes to a clear, homogeneous solution of intermediate viscosity. This solution remains stable if it is stored in a hermetic container.

This reaction is carried out in the cold. The esterified polymer exhibits excellent solubility in anhydrous toluene or anhydrous xylene.

Composition obtained (excluding solvent):

| Composition | Polymer: units of | | | |
|---|---|---|---|---|
| | "MMA-Ti$_{nBu}$" | MMA | BuMA | Ti(OnBu)$_4$ |
| molar % | 3.2 | 11.3 | 66.1 | 19.4 |
| mass % | 6.2 | 6.2 | 51.5 | 36.6 |

EXAMPLE 2

Esterification of the Elvacite® 2550 resin with Ti(OEH)4 at a Ti/COOH molar ratio of 4/1 and at SC=30%

5 g of Elvacite® 2550 resin are dissolved in 19.8 g of anhydrous toluene in a 100-ml single-necked round bottom flask. The addition of 3.50 g of pure tetra(2-ethylhexoxy) titanium is then carried out and the mixture is subjected to vigorous stirring. The viscosity immediately increases greatly and the mixture then slowly becomes less viscous. A stable, homogeneous, viscous solution is finally obtained.

This reaction is carried out in the cold. The esterified polymer exhibits an excellent solubility in anhydrous toluene or anhydrous xylene.

Composition obtained (excluding solvent):

| Composition | Polymer: units of | | | |
|---|---|---|---|---|
| | "MMA-Ti$_{EH}$" | MMA | BuMA | Ti(OEH)$_4$ |
| molar % | 3.6 | 12.5 | 73.2 | 10.7 |
| mass % | 9.6 | 6.4 | 53.1 | 30.9 |

EXAMPLE 3

Esterification of the Elvacite® 2669 resin with Ti(OEH)$_4$ at a Ti/COOH molar ratio of 3/1 and at SC=50%

1 g of Elvacite® 2669 resin is dissolved in 4.75 g of anhydrous 2-methoxyethanol in a 100-ml single-necked round bottom flask. The addition of 1.25 g of pure tetra(2-ethylhexoxy)titanium is next carried out and the mixture is then subjected to strong stirring. The viscosity immediately becomes very high and then decreases gradually. A stable, homogeneous viscous liquid solution is finally obtained.

This reaction is carried out in the cold. It produces the esterified polymer. If anhydrous toluene or xylene is added to the solution thus obtained there is no compatibility problem. Similarly, toluene (or xylene) can be added before the addition of Ti(OEH)$_4$.

Composition obtained (excluding solvent):

| Composition | Polymer: units of | | Ti(OEH)$_4$ |
| --- | --- | --- | --- |
| | "MMA-Ti$_{EH}$" | Comonomers | |
| molar % | 16.3 | 51.1 | 32.6 |
| mass % | 26.3 | 16.6 | 57.1 |

EXAMPLE 4

Esterification of the Elvacite® 2669 resin with Ti(OEH)$_4$ at a Ti/COOH molar ratio of 5/1 and at SC=50%

1 g of Elvacite® 2669 resin is dissolved in 3.11 g of anhydrous 2-methoxyethanol in a 100-ml single-necked round bottom flask. 4.14 g of anhydrous toluene are then added and the mixture is left stirred for a few minutes.

The addition of 6.25 g of Ti(OEH)$_4$ is then carried out and this mixture is subjected to vigorous stirring. A large increase in the viscosity of the mixture is immediately observed and there is then a slow change towards a liquid and viscous homogeneous mixture. This mixture is stable if it is stored in a hermetic container.

This reaction is carried out in the cold.

Composition obtained (excluding solvent):

| Composition | Polymer: units of | | Ti(OEH)$_4$ |
| --- | --- | --- | --- |
| | "MMA-Ti$_{EH}$" | Comonomers | |
| molar % | 12.3 | 38.5 | 49.2 |
| mass % | 16.7 | 10.6 | 72.7 |

EXAMPLE 5

The procedure is as in Example 4, except that 2-methoxyethanol is replaced with 1-methoxy-2-propanol and toluene with xylene, the solvents employed being anhydrous.

EXAMPLES 6 to 8

Antifouling paint formulations

The following compositions were formulated (quantities expressed in % by weight):

TABLE 1

| Paint composition | Example 6 (of the invention) | Example 7 (of the invention) | Example 8 (reference) |
| --- | --- | --- | --- |
| Binder | | | |
| Mixture as obtained in Example 4 | 37.80 | | |
| Mixture as obtained in Example 5 | | 37.80 | |
| Tributyltin acrylate copolymer with SC = 60 % | | | 31.00 |
| Soya lecithin | 0.30 | 0.30 | 0.30 |
| Modified hydrogenated castor oil | 0.90 | 0.90 | 0.90 |
| Viscostab CNF896 | 1.80 | 1.80 | 1.80 |

TABLE 1-continued

| Paint composition | Example 6 (of the invention) | Example 7 (of the invention) | Example 8 (reference) |
| --- | --- | --- | --- |
| Pigments and fillers* | | | |
| Zinc oxide | 10.70 | 10.70 | 10.70 |
| Cuprous oxide | 38.10 | 38.10 | 38.10 |
| Rutile titanium oxide | 1.00 | 1.00 | 1.00 |
| Solvents and diluents | | | |
| Solvent naphtha | | | 6.00 |
| Toluene | 9.40 | | |
| Xylene | 10.20 | 9.40 | 10.20 |

The order of addition was as follows:

binder soya lecithin modified hydrogenated castor oil rutile titanium oxide

Viscostab CNF 896 zinc oxide cuprous oxide solvents

A formulation is produced in 10 minutes to ¼ hour, approximately, by weighing and successive addition of the various ingredients to a porcelain jar. Leaving the jar open between two weighings should be avoided. When all the ingredients have been added, porcelain balls of various diameters, responsible for ensuring the milling, are introduced. The jar is then closed and the mixture is subjected to milling.

The three formulations had a fineness of approximately 50 μm. A planetary mill was employed (12 h minimum, 24 h maximum).

In the formulations of Examples 6 and 7 the esterified Elvacite® copolymer represented 5.90 % and excess Ti(OEH)$_4$ 13%, these percentages being by weight.

In the formulation of Example 8 the dry copolymer represents 18.60% by weight. In the binder of Example 6 the 2-methoxyethanol/toluene weight ratio is 43/57 and in the binder of Example 7 the 1-methoxy-2-propanol/xylene weight ratio is 43/57.

EXAMPLE 9

A formulation is prepared by adding 10% by weight, relative to the dry binder, of dibutyl phthalate as plasticizer to the formulation of Example 7.

EXAMPLE 10

Erosion test with the "Turbo-eroder"

The conditions were the following:

The cylinder (∅=4 to 5 cm) is attached to a motor by a central shaft and is inside a turbine the purpose of which is to prevent the formation of a vortex. The cylinder and the turbine are immersed in a cell containing 40 l of ASTM seawater, T=40° C., pH=8.3. The motor revolves at 620 revolutions/minute, i.e. 40 knots. Each cylinder quarter is coated with a different formulation, one of which constitutes the reference formulation.

The losses in thickness, measured in the course of time (in μm) are reported in Table 2.

TABLE 2

| Formulation | Example 8 (reference) | Example 6 (of the invention) | Example 7 (of the invention) | Example 9 (of the invention) |
|---|---|---|---|---|
| to | 0 | 0 | 0 | 0 |
| to + 76 h | 4 | 0 | 5 | 3 |
| to + 133 h | 9 | 3 | 10 | 6 |
| to + 173 h | 13 | 7 | 13 | 8 |

A loss in thickness (measuring the erosion) which is linear as a function of time is observed.

EXAMPLES 11 to 14

Copolymerization of methyl methacrylate (MMA) and of tri-n-butoxytitanium methacrylate ("MAA-Ti$_{nBu}$")

General procedure

"MAA-Ti$_{nBu}$" is prepared by the equimolar reaction between methacrylic acid (MAA) and Ti(OnBu)$_4$, butanol being removed by distillation.

To the "MAA-Ti$_{nBU}$" is added the sufficient quantity of Ti(OnBu)$_4$ which would have corresponded to a reaction between methacrylic acid and Ti(OnBu)$_4$ with a molar ratio 1/x.

For the copolymerization the MMA/"MAA-Ti$_{nBu}$" molar ratio is set at 95/5; it is equivalent to a 44.3/55.7 mass ratio if x=7 and 35.8/64.2 if x=10, the calculation being done by incorporating the excess Ti(OnBu)$_4$ in "MAA-Ti$_{nBU}$".

The reaction is carried out in a tube which can be sealed. Into it are introduced the various reactants, the anhydrous solvent (toluene) and the initiator ((AIVN)), the latter being employed in a ratio of 0.1% by weight relative to the total mass MMA+MAA-Ti$_{nBu}$ (the latter including excess Ti(O$_n$Bu)$_4$. Three freezing-vacuum-thawing degassing cycles are carried out. The tube is then sealed with a flame and then immersed for 24 h in a bath thermostatted at 60° C.

The polymerization conditions, which are varied, and the results are reported in Table 3 below.

TABLE 3

| Example | 11 | 12 | 13 | 14 |
|---|---|---|---|---|
| 1/x | 1/7 | 1/7 | 1/10 | 1/10 |
| SC (%) | 80 | 30 | 80 | 30 |
| MMA mass (g) | 3.54 | 1.33 | 2.86 | 1.07 |
| "MAA-Ti$_{nBu}$" mass (g) | 4.46 | 1.67 | 5.14 | 1.93 |
| Toluene mass (g) | 2.00 | 7.00 | 2.00 | 7.00 |
| AIVN mass (mg) | 8.00 | 3.00 | 8.00 | 3.00 |

Composition of Example 11 (excluding solvent):

| Composition | Polymer: units of | | |
|---|---|---|---|
| | "MAA-Ti$_{nBu}$" | MMA | Ti(OnBu)$_4$ |
| molar % | 3.8 | 73.1 | 23.1 |
| mass % | 8.2 | 44.3 | 47.5 |

Composition of Example 13 (excluding solvent):

| Composition | Polymer: units of | | |
|---|---|---|---|
| | "MAA-Ti$_{nBu}$" | MMA | Ti(OnBu)$_4$ |
| molar % | 3.4 | 65.6 | 31.0 |
| mass % | 6.6 | 35.8 | 57.6 |

EXAMPLES 15 to 18

Copolymerization of methyl methacrylate (MMA) and of tri(2-ethylhexoxy) titanium methacrylate ("MAA-Ti$_{EH}$")

General procedure leading directly to the mixture "MAA-Ti$_{EH}$"+2-ethylhexanol+excess Ti(OEH)$_4$ "MAA-Ti$_{EH}$" is prepared by mixing MAA and Ti(OEH)$_4$ in ¼ molar proportion. Reaction takes place between one equivalent of MAA and one equivalent of Ti(OEH)$_4$, with formation of 2-ethylhexanol which remains in the mixture. There are therefore 3 equivalents of Ti(OEH)$_4$ in excess.

The reaction is carried out in a tube which can be sealed. The various reactants, the anhydrous solvent (toluene) and the initiator (AIVN) are introduced, the last one being employed in a proportion of 0.1% by weight relative to the monomers (the total mass MMA+MAA-Ti$_{EH}$ (the latter including excess Ti(OEH)$_4$). After degassing of the mixture the tube is sealed and is then immersed for 48 h in a bath thermostatted at 60° C.

The polymerization conditions which were varied and the results are reported in Table 4 below.

TABLE 4

| Example | 15 | 16 | 17 | 18 |
|---|---|---|---|---|
| MMA/"MAA-Ti$_{EH}$" molar ratio* | 95/5 | 95/5 | 70/30 | 70/30 |
| MMA/"MAA- Ti$_{EH}$" mass ratio | 44.8/55.2 | 44.8/55.2 | 9.1/90.9 | 9.1/90.9 |
| SC (%) | 30 | 80 | 30 | 80 |
| MMA mass (g) | 1.34 | 3.59 | 0.27 | 0.73 |
| "MAA-TiEH" mass (g) | 1.66 | 4.42 | 2.73 | 7.27 |
| Toluene mass (g) | 7.00 | 2.00 | 7.00 | 2.00 |
| AIVN mass (mg) | 3.00 | 8.00 | 3.00 | 8.00 |

*calculation done by incorporating excess Ti (OEH)$_4$ in "MAA-Ti$_{EH}$".

Composition of Example 16 (excluding solvent):

| Composition | Polymer: units of | | |
|---|---|---|---|
| | "MAA-Ti$_{EH}$" | MMA | Ti(OEH)$_4$ |
| molar % | 4.5 | 81.8 | 13.7 |
| mass % | 13.0 | 44.8 | 42.2 |

Composition of Example 18 (excluding solvent):

| Composition | Polymer: units of | | |
|---|---|---|---|
| | "MAA-Ti$_{EH}$" | MMA | Ti(OEH)$_4$ |
| molar % | 16.1 | 35.6 | 48.3 |
| mass % | 21.4 | 9.1 | 69.5 |

Example 19 (comparative) and 20–21 (of the invention)

Copolymerization of methyl methacrylate (MMA) and of tri(2-ethylhexoxy)titanium methacrylate ("MAA-Ti$_{EH}$")

"MAA-Ti$_{EH}$" is prepared as described in Example 2 of the patent application indicated in the present Examples 11–14.

The "MAA-Ti$_{EH}$" is then mixed with 3 equivalents of Ti(OEH)$_4$ (Examples 20–21). This mixing is not performed in the case of Example 19.

Copolymerization is carried out as described in Examples 11 to 18, at 60° C. for 48 h, in toluene, with 0.1 % by weight of AIVN as initiator, relative to the total mass MMA+MAA-Ti$_{EH}$ (the latter including the excess (Ti(OEH)$_4$).

The polymerization conditions which were varied and the results are reported in Table 5.

TABLE 5

| Example | 20 (comparative) | 21 (of the invention) | 22 (of the invention |
|---|---|---|---|
| Ratio 1/x* | 1/1 | 1/4 | 1/4 |
| MMA/"MAA-Ti$_{EH}$" mass ratio** | 78.5/21.5 | 46.2/53.6 | 46.2/53.8 |
| MMA mass (g) | 6.28 | 3.70 | 1.39 |
| "MMA-TiEH" mass (g) | 1.72 | 4.30 | 1.16 |
| Toluene mass (g) | 2 | 2 | 7 |
| AIVN mass (mg) | 8 | 8 | 3 |
| Results | gelled | fairly viscous very slightly yellow liquid | slightly viscous very slightly yellow-coloured liquid |
| Final appearance | chestnut-coloured | | |

*defined in Examples 11–14
**calculation done by incorporating excess Ti(OEH)$_4$.

In the above examples where the expression "in the cold" is used, it is meant at ambient conditions—about 20–25° C.

For further details of how to make the unsaturated organometallic compounds derived from titanium, i.e., compounds of formula I, attention is directed to the cross-referenced application.

The preceding examples can be repeated with similar success by substituting the generically or specifically described reactants and/or operating conditions of this invention for those used in the preceding examples.

The entire disclosure of all applications, patents and publications, cited above, and of corresponding French application No. 96/10374, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. A gel-free composition comprising an anhydrous organic solvent and a polymer containing units derived from methacrylic acid which are esterified with —Ti(OR)$_3$ groups, mixed with free Ti(OR)$_4$ which represents the excess of Ti(OR)$_4$ which has been introduced for the preparation of the said polymer in sufficient quantity for the resulting composition to be not in gel form, R denoting one of ethyl, isopropyl, n-butyl, t-butyl, 2-ethylhexyl and t-amyl.

2. A composition according to claim 1, characterized in that the esterified polymer is a copolymer containing esterified methacrylic acid units and units of at least one alkyl methacrylic acid comonomer.

3. A resin composition according to claim 1, characterized in that it is in a solvent medium comprising toluene, xylene, an alcohol ether, or mixtures thereof.

4. A Composition according to claim 1, characterized in that its solids content is 20–80% by weight.

5. A Composition according to claim 1, characterized in that it is the product of esterification in a solvent medium of a polymer containing units derived from methacrylic acid with Ti(OR)$_4$, the Ti/COOH molar ratio being higher than 1.

6. A Composition according to claims 1, characterized in that it is the product of radical copolymerization in a solvent medium of at least one methacrylic acid esterified with Ti(OR)$_3$ and of at least one comonomer, in the presence of Ti(OR)$_4$, in a quantity which would have corresponded to a reaction between methacrylic acid and Ti(OR)$_4$ with a molar ratio 1/x, x>1.

7. A Composition according to claim 6, characterized in that it also contains the ROH originating from the esterification of the methacrylic acid with Ti(OR)$_4$, the crude product of the said esterification having been introduced into the copolymerization reaction.

8. A Marine antifouling paint composition characterized in that it includes, as binder, the composition as defined in claim 1.

9. A Paint composition according to claim 8, characterized in that the binder is present in the paint composition in a proportion of from 30 to 40% by weight of the total.

10. A composition according to claim 9, characterized in that it includes: adjuvants; pigments; solvents and diluents.

11. A composition according to claim 1, wherein based on 100 parts by mass of the total mass of said polymer and free Ti(OR)$_4$, the mass proportion of said polymer is 4–27 parts of methacrylic acid units esterified with Ti(OR)$_4$ and 5–63 parts of comonomer units, and 22–86 parts of said free Ti(OR)$_4$.

12. A composition according to claim 2, wherein at least one alkyl methacrylic acid comonomer is a $C_1$ to $C_6$ alkyl methacrylic acid comonomer.

13. A resin composition according to claim 3, wherein the solvent medium comprises 2-methoxyethanol or 1-methoxy-2-propanol.

14. A composition according to claim 11, characterized in that the esterified polymer is a copolymer containing esterified methacrylic acid units and units of at least one alkyl methacrylic acid comonomer.

15. A composition according to claim 11, characterized in that it is in a solvent medium comprising toluene, xylene, an alcohol ether, or mixtures thereof.

16. A composition according to claim 11, wherein R is ethyl.

17. A composition according to claim 11, wherein R is isopropyl.

18. A composition according to claim 11, wherein R is n-butyl.

19. A composition according to claim 11, wherein R is t-butyl.

20. A composition according to claim 11, wherein R is ethylhexyl.

21. A composition according to claim 11, wherein R is t-amyl.

22. A composition according to claim 5, wherein the Ti/COOH molar ratio is between 3:1 and 10:1.

23. A marine antifouling paint composition characterized in that it includes, as binder, the composition as defined in claim 11.

24. A marine antifouling paint composition characterized in that it includes, as binder, the composition as defined in claim 2.

25. A paint composition according to claim 24, characterized in that the binder is present in the paint composition in a proportion of from 30 to 40% by weight of the total.

26. A paint composition according to claim 23, characterized in that the binder is present in the paint composition in a proportion of from 30 to 40% by weight of the total.

* * * * *